INVENTOR
Eric V. Bergstrom

Dec. 4, 1962  E. V. BERGSTROM  3,067,131
PERIODIC INTRODUCTION OF GRANULAR CONTACT MATERIAL
INTO HIGH PRESSURE VESSEL
Filed March 27, 1961  3 Sheets-Sheet 2

INVENTOR
Eric V. Bergstrom

BY Charles A. Huggett

ATTORNEY

INVENTOR
Eric V. Bergstrom

United States Patent Office 3,067,131
Patented Dec. 4, 1962

3,067,131
PERIODIC INTRODUCTION OF GRANULAR CONTACT MATERIAL INTO HIGH PRESSURE VESSEL
Eric V. Bergstrom, Byram, Conn., assignor to Socony Mobil Oil Company, Inc., a corporation of New York
Filed Mar. 27, 1961, Ser. No. 98,540
1 Claim. (Cl. 208—173)

This invention relates to the feeding of solid granular particles from a low pressure region to a region of substantially higher pressure. It more particularly relates to the downward introduction of granular catalyst or granular contact material into a gas contacting zone maintained at advanced pressure, such as a reaction zone, from a storage zone maintained at a lower pressure located above the contacting zone. In less restricted form, however, the invention relates to the transfer of granular material downwardly to an enclosed region and intermittent transfer from said region to a zone maintained under high gaseous pressure.

The invention is particularly suited for use in moving bed systems of the general type in which reaction and regeneration are accomplished simultaneously in separate confined zones through which the catalyst or contact material is passed as a relatively compact bed of solid particles. The fluid reactants are passed through the bed of solid particles in the reaction zone continuously and the regenerating fluid is passed through the bed of solids in the regeneration zone. The particles are transferred continuously from the bottom of one zone to the top of the alternate zone to complete an enclosed cyclic path. The particles may be elevated between the zones by means of mechanical elevators of the continuous bucket or Redler type, fluid lifts wherein the particles are propelled upwardly through a lift passage in a stream of rapidly-moving lift gas or gas pressure lifts wherein the granular material is moved upwardly through an upwardly-extending pipe as a continuous confined column by means of the gas pressure differential across the pipe. The granular material used in this invention must be large enough to flow by gravity as compacted columns through drain legs of restricted cross-section. For example, the particles may be in the size range of about 3–60 mesh Tyler but must not be of a size smaller than 100 mesh Tyler commonly referred to as powder. The size range preferred is of the order of 4–12 mesh Tyler or, in other words, particles of about 1/8" to 1/4" in diameter. Various processes to which this invention can be applied include reforming, hydroforming, cracking, isomerization, alkylation, isoforming, aromatization, dehydrogenation, hydrogenation, cyclizing, dehydrocyclizing, treating, polymerization, the conversion of propane to acetyylene, coking and vis-breaking. Various materials, such as natural or treated clays, synthetic associations of alumina, chromia and magnesia or metal, porcelain or glass fragments can be used as the contact material.

The invention has broad application to many processes, such as those listed above, as well as to other gas-solid contacting operations, in which a granular material must be introduced periodically into a high pressure reaction zone or contacting zone without damage to the granular material. For convenience, the invention will be described with reference to the high-pressure catalytic cracking of hydrocarbons to produce lighter material boiling in the gasoline boiling range. In this process, the catalyst, such as 4–10 mesh Tyler gel beads, may be gravitated as a substantially compact bed through a reaction zone. This conversion or reaction zone is maintained at a temperature of about 800–1000° F. and at an elevated pressure such as 15–100 p.s.i. (gauge) since certain process advantages are obtained by the use of these elevated pressures. The reactants are preheated to about 700–800° F. and introduced into the conversion zone as a vapor, liquid or mixture of both. The hydrocarbons pass through the voids in the bed and are withdrawn as converted products after passage through the proper depth of catalyst bed. The catalyst cools and becomes spent during use and hence must be removed from the conversion zone and replaced with fresh catalyst from time to time. The catalyst removed from the bottom of the conversion zone is transferred to the top of a gravitating bed of the solid material in the regeneration zone.

A gas, usually air, is introduced into the bed of solids in the regeneration zone to burn carbonaceous material from the surface of the catalyst or contact material. The flue gas formed is removed continuously from the zone after passage through the required depth of catalyst bed. The pressure is generally maintained at substantially atmospheric pressure, although in some instances, it may be desirable to operate this zone at other pressures. The temperature in the regenerating zone is usually maintained at about 1000–1300° F. When inerts are used as a heat transfer medium, such as mullite, carborundum, coke, or fused alumina, the temperature may be substantially in excess of 1300° F., but for catalytic cracking, this upper limit must not be exceeded or the catalyst material will be heat damaged and rendered unfit for re-use. The heat-damaging tempearture varies to some extent with the type of catalytic material being used. For example, the limit for natural or treated clay catalyst is about 1200° F., whereas the limit for synthetic silica gel type catalyst is about 1400° F. It is essential in these processes that the catalyst not be damaged either chemically or physically since the catalyst is so expensive that it must be used repeatedly for long periods of time in order to make these processes economically feasible.

The regenerated catalyst is withdrawn from the bottom of the regenerating zone and transferred to the top of the reaction or conversion zone. The problem of introducing the granular catalyst into the conversion zone against the advanced pressure maintained in that zone has troubled industry since the origin of these continuous conversion systems. Star valves and gas type mechanical measuring devices as well as positive feeding valves, screw conveyors, catalyst pumps, pressure lock systems with gas-tight valves in catalyst lines before and after pressuring chambers, have all been suggested heretofore in the prior art as means for feeding catalyst from a low-pressure zone to a higher pressure zone therebelow. These valves and devices all cause high catalyst attrition losses and are themselves subjected to severe wear and rapid failure at the high temperature conditions involved. The problem of maintaining proper lubrication in the moving parts of such mechanical feed means is a serious one and the failure of proper lubrication results in the failure of the mechanical feed device. Such mechanical feed devices at best require constant attention from the operator and have always been found eventually to fail with resultant disruption in the operation of the conversion system.

Another means suggested by the prior art for feeding catalyst into pressure reacting zones is the gravity feed leg described and claimed in U.S. Patents Nos. 2,410,309 and 2,531,365. This comprises an elongated substantially compact column of catalyst in an upwardly-extended passage above the reaction zone in open communication with the pressured reaction zone. The calculated head or weight of catalyst in the column per unit of cross-sectional area is sufficient to permit the catalyst to feed into the reaction or conversion zone smoothly and continuously against the advanced pressure without restrictions in the passage. There is no head developed in a catalyst column maintained in compacted form in the manner that a fluid head is developed at the base of a pipe full of fluid. However, it has been found that when the value obtained by dividing the weight of catalyst in the column by the cross-section of the base of the column is above a critical limit, the solids will flow downwardly in compact columnar form into the advanced pressure zone and when the value is below the critical level, the solids will not flow. It is convenient, therefore, to refer to the so-called calculated head of catalyst in the feed leg. The column is made as small as possible in cross-section, consistent with the catalyst flow requirements of the reaction zone to prevent the escape of reactants from the reaction zone. The top of the column is continuously replenished with catalyst from a storage zone. These feed legs are a very substantial improvement over the mechanical feeding devices, as is evidenced by their exclusive use in commercial moving bed catalyst systems. However, gravity feed legs of the compact flowing catalyst type require the provision of roughly 4–5 feet of leg height per pound of pressure differential across the leg; they cannot be used where the pressure drop per foot of leg exceeds about .20–.25 p.s.i./ft. As a result of obvious practical considerations, such legs have not been recommended in systems requiring feeding against gaseous pressure differentials in excess of about 30 p.s.i. and have not been used commercially for feeding against pressures in excess of about 15 p.s.i. (gauge). Even in the present day commercial catalytic cracking units, these legs are about 80–100 feet tall and require extensive structural steel to support them and surge hoppers above them at heights up to twice the height which would otherwise be required for the entire catalytic conversion system. Gravity feed legs cannot be used conveniently for feeding of catalyst in processes which operate at advanced pressures of 15–100 p.s.i. (gauge) or even higher. Although in many instances substantial advantages could be obtained by cracking at pressures higher than 15 p.s.i. (gauge), commercial cracking reactors of the moving bed type have been maintained at pressures below 15 p.s.i. (gauge) primarily because of the lack of a satisfactory high pressure catalyst feeding technique.

I have found that catalyst or granular contact material can be fed into a high pressure reaction zone without damage when the granular material is mixed with or combined with a ferrous or magnetic material so that the gravitating column of contact material is strongly responsive to a magnetic field. The mixture of catalyst or granular contact material and ferrous material is passed downwardly as a compact column through a seal leg or short passage from a supply zone to a pressuring zone when the pressure in the pressuring zone is low. The fluid pressure in the pressuring zone is raised periodically to a level sufficient to stop the downward flow of granular material in the passage and granular material is removed from the pressuring zone. The seal leg is maintained static by applying a magnetic field to the column of granular material and increasing the fluid pressure in the pressuring zone to a pressure which is above that in the supply zone by an amount in excess of the value obtained by dividing the weight of the solid material in the passage by the average horizontal cross-section thereof and preventing disruption of the compactness of the column and upward discharge of the solid material from the passage by the combined effect of the magnetic field and the downward force obtained by maintaining on top of the column a compact bed of the granular material of substantially greater horizontal cross-sectional area than the column in which the fluid escaping from the column decelerates, the bed being of sufficient horizontal cross-sectional area and vertical depth to effect deceleration of the fluid to a linear velocity below that which would disrupt the compactness of the bed substantially before it reaches the surface of the bed. In a preferred embodiment of the invention, granular material is gravitated as a compact column from a supply zone through a first passage to a pressuring zone when the pressure in that zone is low and downwardly from the pressuring zone through a second passage to a high pressure or conversion zone when the pressure in the pressuring zone is elevated to a pressure at least near that of the conversion zone. Direct current is alternately passed through a solenoid about the first passage when the pressure in the pressuring zone is high and through a solenoid about the second passage when the pressure in the pressuring zone is low to prevent the seal columns from being blown out of the passages. Other species of the invention are disclosed in detail hereinafter.

The object of the invention is to provide an improved method and apparatus for transferring a granular contact material downwardly from a first zone at low pressure into a second zone located therebelow and maintained at substantially high pressure, the distance between the first and second zones being substantially less than that which would correspond to a column of contact material or catalyst providing a calculated head equal to the pressure differential between the two zones.

A further object of the invention is to provide a method and apparatus for feeding periodically a granular contact material into a high pressure reaction or conversion zone without requiring an exceedingly tall feeding structure above the reaction zone.

A further object of the invention is to provide an improved method and apparatus for feeding a granular contact material into a high pressure reaction or conversion zone without damaging the granular contact material.

The invention will be disclosed hereinafter in more detail with reference to the attached drawings. Similar parts have been given the same reference number in the various figures for simplicity. The figures are all highly diagrammatic in form, being provided to facilitate the description of the invention.

Figure 1:
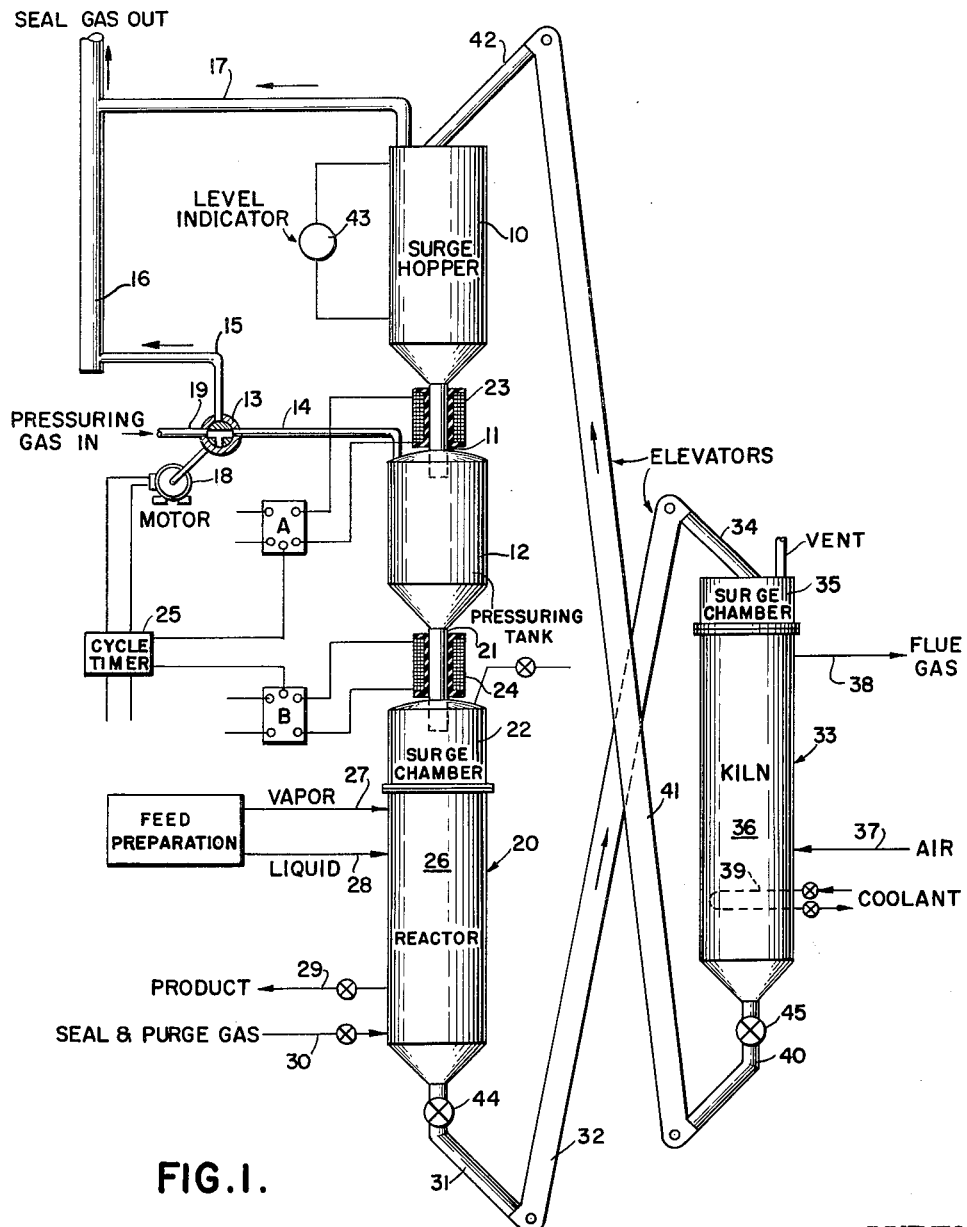
FIGURE 1 shows a complete hydrocarbon conversion system with side-by-side arrangement of the reactor and kiln and bucket elevators for raising the catalyst.

Referring to FIGURE 1, granular material is gravitated from a supply hopper or surge hopper 10 through a short conduit 11 into a pressuring tank 12 when the pressure in the tank 12 is low. The pressure in the tank 12 is reduced to atmospheric pressure by rotating the three-way valve 13 to connect the conduit 14 with the conduit 15, which connects to stack 16. The surge hopper 10 is also connected to the stack 16 by means of the conduit 17. Periodically the three-way valve 13 is rotated by means of the motor 18 to connect the conduit 19 to the conduit 14, thereby admitting a gas into the tank 12 to increase the pressure in the tank. The pressure is raised to substantially that of the high pressure reactor 20. Granular material flows from the tank 12 through the conduit 21 into the surge chamber 22 in the top of the reactor 20. Meantime, the flow of granular material through the conduit 11 is stopped because the pressure differential across the conduit is sufficient to blow the granular material upwardly through leg 11. This is prevented, however, by the maintenance of an expanded bed of granular material in the surge hopper 10 on top of the column of granular material in the conduit 11 and by energizing the solenoid located about the conduit 11, as disclosed in more detail hereinafter. When the pressure in the pressuring tank 12 is low, the solenoid 23 is de-energized and the solenoid 24 is energized to prevent the solid particles from being blown upwardly through the leg 21 to the pressuring tank 12. The solenoids 23, 24 are controlled by relays A and B, which are operably connected to a cycle timer 25. The cycle timer 25 may also be used to control the motor 18 which operates the three-way valve 13. It is noted that the conduits 11 and 21 are of restricted cross-section when compared with the cross-section of the surge hopper 10 and pressuring tank 12. This arrangement provides for the reduction of the upward velocity of gas passing upwardly through the column of granular material in the conduits 11 and 21, the expanded bed of granular material in the surge hopper 10 and pressuring tank 12 being maintained at all times of sufficient depth and cross-section to provide a substantial downward force tending to hold the columns in compact static condition when the pressure beneath the columns is elevated. The ratio of height of the conduits 11 or 21 to diameter should be at least about 2½/1 and may range up to about 10 to 15/1. When the conduits are maintained within this range and the column of granular material in the conduits is maintained static, a substantial portion of the upward force appears to be absorbed by the walls of the conduits so that only a minimal amount of downward holding force need be provided by the downward weight of the expanded bed above the column and the holding force of the magnetic field on the ferrous material associated with the granular contact material or catalyst. When the height to diameter ratio of the conduits is greater than 15 to 1, the height of the feeding structure becomes undesirably great, approaching that of a gravity feed leg and hence should be avoided for that reason.

Granular material under pressure is gravitated from the surge zone 22 onto the top of a gravitating column of the contact material in the reaction zone 26. Hydrocarbons are introduced into the reaction zone through the conduits 27, 28 in either liquid or vapor form. The hydrocarbons are passed downwardly through the bed of contact material in the reaction zone 26 and the converted products are withdrawn from the bottom of the zone through the conduit 29. A seal and purge gas may be introduced into the bottom of the reactor through the conduit 30.

During conversion a carbonaceous deposit accumulates on the contact material. The contaminated material is withdrawn through the conduit 31 and elevated by means of the elevator 32 to a level above the kiln 33. The spent contact material is gravitated from the top of the elevator through the sloping conduit 34 into a surge chamber 35 in the upper portion of the kiln 33. The contact material is gravitated from the surge chamber 35 onto the top of a gravitating column of the contact material in the burning zone 36. Air is introduced into the burning zone through the conduit 37. The air is passed upwardly through the bed of contact material and flue gas formed by combustion of the carbonaceous material is withdrawn from the top of the zone through the conduit 38. A suitable coolant fluid may be passed through the cooling coils 39 to control the temperature in the burning zone and to prevent the contact material from being overheated. The regenerated contact material is withdrawn through the conduit 40 and elevated by means of the elevator 41 to a level above the supply hopper 10. The reactivated contact material is gravitated from the top of the elevator through the sloping conduit 42 onto the top of the mass of material in the hopper 10. The level indicator 43 may be used to maintain a suitable level of contact material in the hopper. The rate at which the contact material gravitates through the reaction and burning zones is controlled by the valves 44 and 45.

Figures 2, 3:
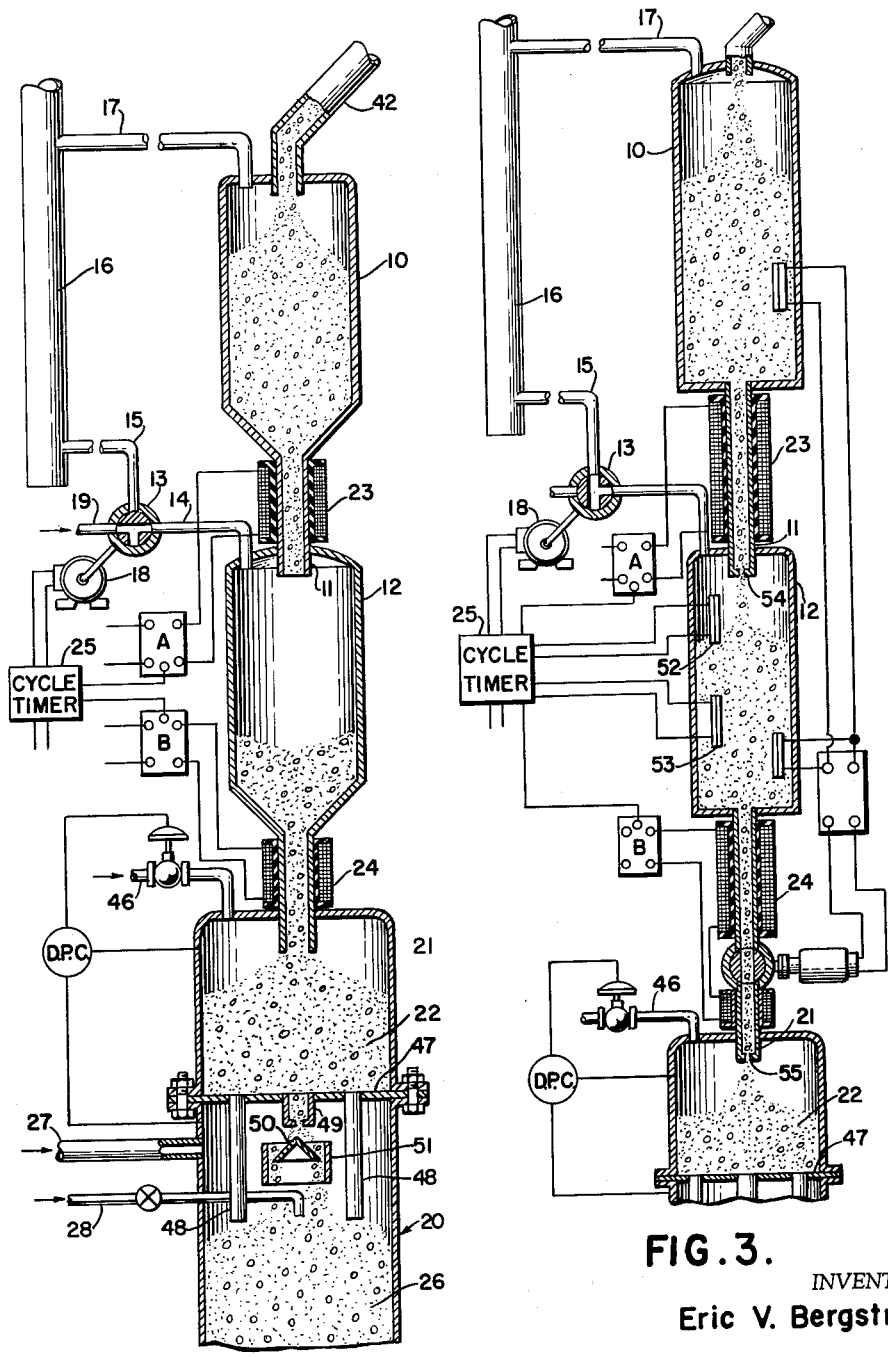
FIGURE 2 shows in vertical section an arrangement of vessels and conduits for feeding granular material downwardly into a high pressure vessel.
FIGURE 3 shows in vertical section an alternate arrangement of apparatus for feeding granular material downwardly into a high pressure vessel.

The invention is shown more clearly on FIGURE 2. A granular material having magnetic properties is associated with the contact material and travels downwardly with the compact mass. The ferrous or magnetic material can be mixed with the granular material or incorporated in the granular material as desired. When the tank 12 is under pressure and the solenoid 23 energized, the magnetic material is urged to remain fixed. This is offset by the tendency of the gas to drive the solid material upwardly into the hopper 10. The action of the solenoid tends to prevent the upward movement of the magnetic material, which serves to block the upward flow of the granular material. As the gas passes upwardly through the granular material, its upward velocity and hence lifting force is reduced in the expanded bed portion so that near the top of the bed, the downward force of the weight of the granular material becomes greater than the upward force of the rising gas. Hence, a downward force is applied at the top of the column of granular material which tends to hold the column in compact static condition. The joint actions of this downward force and the holding electromagnetic force serve to hold the seal column static and prevent the escape of any substantial amount of the seal gas.

FIGURE 2 shows that the cross-section of the hopper 10 is larger than the cross-section of the conduit 11 and that the lower end of the hopper 10 has a cone shaped bottom of gradually reducing cross-section from top to bottom. This provides a seal leg of uniform cross-section in the conduit 11 and gradually increasing cross-section in the hopper 10. As the pressure in the pressuring hopper 12 is increased, the gas velocity in the column of particles in the conduit 11 will increase until that velocity is reached at which the bed would be disrupted and no longer remain in static condition. In the lower portion of the hopper 10 the velocity is reduced to the bed disrupting velocity at some level, termed the critical level. If the cross-section of the bed above the critical level is further expanded and a bed of contact material maintained above the critical level of sufficient depth the leg in conduit 11 can be maintained in compact form. This is explained and claimed in copending application for U.S. Patent Serial Number 390,468, filed November 6, 1953, now Patent Number 2,851,401. However, when the depth of the bed in the hopper 10 is not sufficient to hold the column in compact condition, the joint action of the holding power of the expanded bed in which the upwardly flowing gas decelerates combined with the magnetic holding power permits the maintenance of static conditions in the seal leg and permits the seal leg to withstand a substantially greater pressure differential than could be tolerated without the magnetic holding power. This joint holding action permits the feeding arrangement to be shortened considerably and yet permits solids introduction on a periodic basis into a high pressure reactor without mechanical interruption in the flow of the catalyst column.

Referring again to FIGURE 2, the pressuring vessel 12 is intermittently filled and partially emptied. During the filling cycle the upper solenoid is de-energized and the lower solenoid is energized to hold the seal column in the conduit 21 in static condition. An inert seal gas is introduced into the chamber 22 through the conduit 46 to maintain the pressure in the chamber 22 at about the same pressure as is maintained in the reaction zone 26. When the valve 13 is rotated, the gas pressure in the vessel 12 is raised to substantially that of the reaction zone 26. The solenoid 23 is energized and the solenoid 24 is de-energized. The column of contact material in the conduit 11 is held in fixed position and the column of contact material in the conduit 21 commences to flow. The flow fills the hopper 22 up to the level of the lower end of the conduit 21. The cycle is reversed before the hopper 12 is emptied of contact material and the level in the hopper is rapidly raised to the bottom of the conduit 11. The contact material is gravitated from the floor 47 of the chamber 22 through the pipes 48 to maintain a bed of solid material in the reaction zone 26. A portion of the solid material is fed into the central region of the reaction zone through the pipe 49 and directed by means of the conical baffle 50 and cylindrical baffle 51 to form a curtain of falling contact material about the discharge end of the liquid feed pipe 28.

Referring now to FIGURE 3, there is shown a similar feeding apparatus to that of FIGURE 2. The contact material is a granular solid material and the magnetic material is made up of substantially larger granular particles. The storage hopper 10 and pressuring hopper 12 can be flat bottomed vessels rather than the type shown in FIGURE 2. In this embodiment, level indicators 52 and 53 are located in the pressuring hopper 12 at the upper and lower limits for the bed in the hopper. The level indicators are connected to the cycle timer 25 so that as each level is reached the cycle is changed. It is important in this invention that the solid material in the legs 11 and 21 be kept in the form of a compacted column. Where the bed level is not allowed to build up to the bottom of these seal legs before the cycle is changed, some means must be provided for keeping the material in the leg in compacted form. The orifice plates 54 and 55 are located at the bottom of the legs to perform this service.

Figure 4:
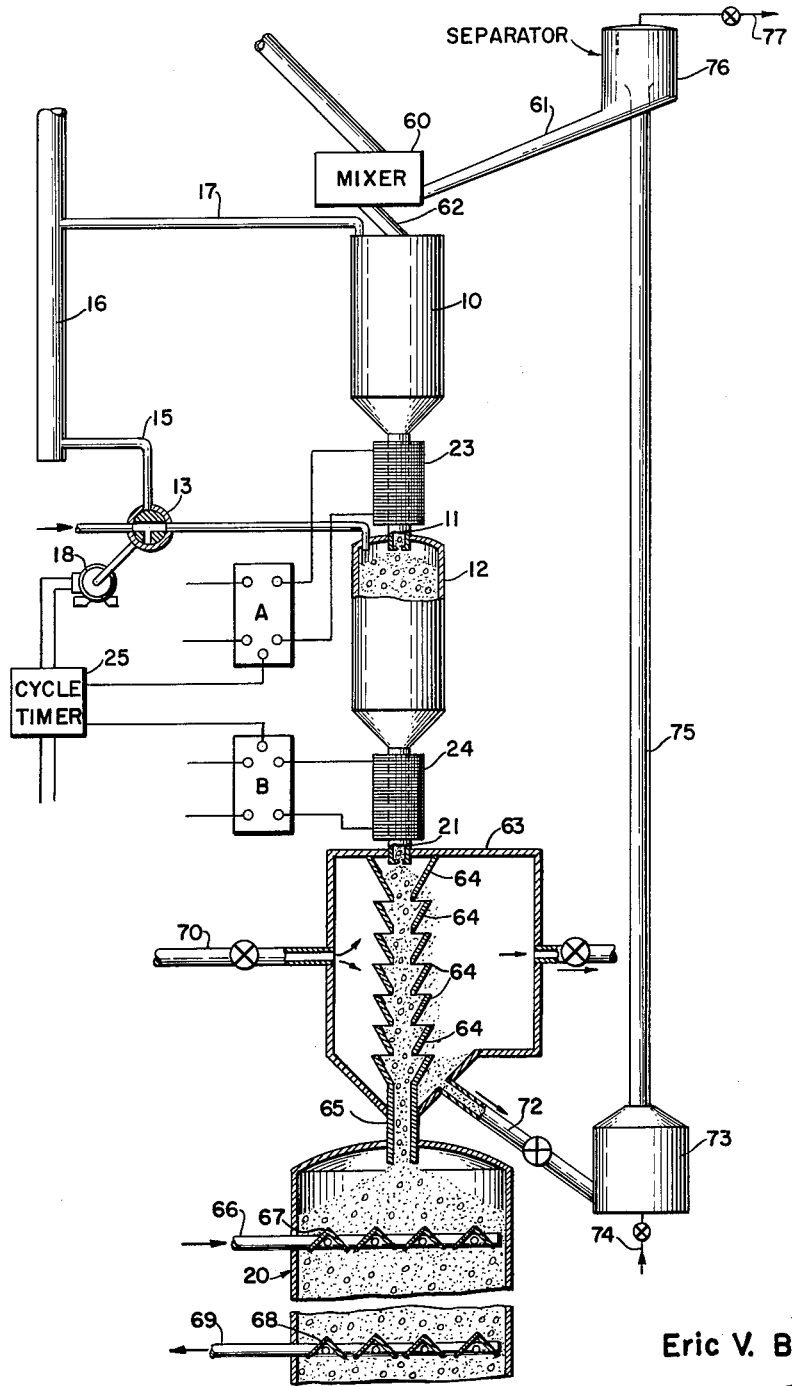
FIGURE 4 shows, partially in section, alternate apparatus for feeding a granular catalyst into a high pressure reactor.

On FIGURES 2 and 3 it was shown that the magnetic material traveled through the system with the contact material or catalyst. The magnetic material can be formed of particles separate from the catalyst, as shown. Alternatively, the catalyst can be a non-magnetic material, such as silica, alumina, or the like, having a magnetic material incorporated therein. The magnetic or ferrous material is associated with the catalyst or granular contact material in sufficient amount to be strongly responsive to a magnetic field, the term "associated" being used to include the use of either a separate magnetic material or a magnetic material incorporated in a non-magnetic material. A further alternative arrangement is shown in FIGURE 4 where the magnetic material is made a part of the stream of contact material only during passage through the pressure feeding apparatus. The granular catalyst is passed through conduit 42 into a mixing chamber 60. The granular material may be sized about 3-12 mesh Tyler. A fine magnetic steel material having a size range about 40-60 mesh Tyler is passed through the conduit 61 into the mixing chamber 60 to mix with the granular catalyst and pass as a mixed stream through the conduit 62 into the storage hopper 10. The material is passed downwardly through the conduit 11, pressuring hopper 12 and conduit 21 into the separator 63. The separator is maintained at about the same pressure as the reactor. A plurality of trough-shaped members 64 are located across the separator 63. The trough-shaped members have a slotted aperture in their bottom and the side walls of said member slope outwardly from bottom to top.. The members are located in vertical alignment. The upper end of each trough-shaped member is open to the interior of the separator 63, thereby allowing gas to move laterally into and out of the gravitating column of material passing downwardly through the aperture in each member to the next lower member. The lowermost member has a depending spout 65 which projects into the top of the reactor 20 to form a gravitating mass of particles therein. The hydrocarbon charge is introduced through conduit 66 and channels 67 into the bed of solids and is withdrawn from the bed as converted products through the channels 68 and withdrawal conduit 69. A gas is introduced through the conduit 70 into the separator 63 at one side of the troughs 64 and withdrawn from the separator through the conduit 71 at the other side of the trough-shaped members 64. The gas, in passing through the column of solids, removes the fine particles of magnetic steel and they are collected in the bottom of the separator 63. The fines are passed through the conduit 72 to the lift feed tank 73. A lift gas is introduced into the tank 73 through the conduit 74 to lift the particles through the lift pipe 75. The gas and particles are separated in the separator 76. The gas is removed through the conduit 77 and and the particles are gravitated through the conduit 61 back to the mixer 60.

*Example*

The invention may be illustrated by using a vertical seal leg or conduit 8" in diameter and ten feet long having a conical hopper on top thereof having a diameter at the bottom of the cone equal to 8" and a diameter 41½ inches above the bottom of the cone equal to 51 inches, the taper being uniform from bottom to top, using bead catalyst having a density of 43 pounds per cubic foot mixed with soft iron aggregate of a particle size about 0.1" diameter in ratio of about 1 part catalyst to 1 part iron particles. The bottom of the conduit communicates with a container maintained at a set gas pressure by continuous introduction of air. The pipe may be wired as a wound solenoid such as is illustrated on FIGURE 1 and with the application of 220 volts to the solenoid and the application of 30 p.s.i. gaseous pressure provides a static seal leg with a total bed height above the end of the seal leg of 36 inches. It is seen that the pressure drop per foot across this seal leg is about 3 p.s.i./ft. which is substantially greater than the 0.20–0.25 permissible with a continuously flowing gravity feed leg.

The pressuring gas used in this invention can be any suitable gas, such as carbon dioxide, flue gas or air. The pressuring medium does not necessarily have to be a gas. If a liquid-solid contacting operation is involved, the pressuring medium can be a liquid, such as water or liquid petroleum products. A variety of magnetic materials may be used, such as iron or steel alloys generally referred to as ferrous materials in the sense that they are responsive to a magnetic field. The magnetic material may be in the form of separate granules, spheres or pellets mixed with the catalyst material or with inert contact material as the case may be. The ratio of magnetic material to catalytic material by weight may range from about 1 to 10 to about 1 to 1, depending upon the strength or weakness of the magnetic field employed and the desired holding effect necessary to maintain the seal column static. The magnetic material may be larger or smaller than the catalyst to facilitate physical separation by size or the materials may be the same size and separation obtained by some other technique. The magnetic material may also be incorporated directly into the catalyst or inert contact material. It may be incorporated by impregnation or by actually mixing the magnetic material with the catalytic material and forming the wet mixture into pellets or by other means. It is also contemplated that the magnetic material may constitute a core around which the catalytic material is deposited.

It should be understood that this invention covers all modifications and changes of the examples herein chosen to illustrate the invention for purposes of disclosure, which do not constitute departures from the spirit and scope of the invention. This application is a continuation-in-part of application Serial No. 356,856, filed May 22, 1953.

I claim:

The method of feeding catalyst to a hydrocarbon conversion zone from a supply zone under substantially lower pressure than the hydrocarbon conversion zone a distance substantially less than that corresponding to a column of said catalyst of sufficient length to permit gravity flow of the catalyst into said conversion zone, said catalyst associated with a sufficient amount of ferrous material to be strongly responsive to a magnetic field, which method comprises: flowing the catalyst and associated magnetizable ferrous material downwardly from said supply zone through a first vertical passage of substantially smaller cross-section than said supply zone as a confined compact stream and discharging it downwardly into a confined pressuring zone located elevationally between said supply and conversion zones and existing under a pressure substantially below that in said conversion zone and sufficiently low to permit gravity flow of the catalyst and associated magnetizable ferrous material thereinto from said supply zone, supplying catalyst and associated ferrous material to the supply zone, periodically increasing the gaseous pressure in said pressuring zone to a level near that in said conversion zone and sufficiently high to permit flow of catalyst and associated magnetizable ferrous material from said pressuring zone downwardly through a second vertical passage of substantially smaller cross-section than said pressuring zone as a compact stream into said conversion zone by supplying a gas under pressure to said pressuring zone, while, without obstructing said first passage, maintaining the same filled substantially throughout its length with a compact column of catalyst and associated ferrous material by applying a magnetic field to said column and withdrawing gas escaping upwardly from said column through a compact bed of said solids maintained in the supply zone on top of said column, the pressure differential across said column being in excess of about 0.5 p.s.i./ft. of vertical column height and at least in excess of the value obtained by dividing the weight of the solid material in the column by the average horizontal cross-section thereof, maintaining the bed in said supply zone at all times at least of such vertical and horizontal dimensions to cause gas from the column to be decelerated to a velocity slightly below the bed disrupting velocity at a level spaced a substantial distance below the bed surface, the length of the bed above that level being sufficient to provide a substantial downward thrust which, combined with the magnetic force, maintains the catalyst and associated ferrous material in the first passage in substantially compact static form throughout the length of the passage, said magnetic force, while insufficient by itself to retain the column of catalyst in the passage, being sufficient to stabilize said column of catalyst and cooperate with said expanded bed in the retention of the column in compact static form reducing the gaseous pressure in said pressuring zone and removing the magnetic field from said first column periodically to prevent said pressuring zone from emptying of catalyst and associated magnetizable ferrous material and to replenish said catalyst and associated ferrous material supply from said supply zone, while, without obstructing said second passage, maintaining the same filled substantially throughout its length with a compact column of catalyst and associated ferrous material by applying a magnetic field to said column and withdrawing gas escaping upwardly from said column through a compact bed of said solids maintained in said pressuring zone on top of said column, the pressure differential across said column being in excess of about 0.5 p.s.i./ft. of vertical column height and at least in excess of the value obtained by dividing the weight of the solid material in the column by the average horizontal cross-section thereof maintaining the gas pressure in said conversion zone substantially constant by introducing gas into said conversion zone, maintaining the bed in said pressuring zone at all times at least of such vertical and horizontal dimensions as to cause gas from the column to be decelerated to a velocity slightly below the bed disrupting velocity at a level spaced a substantial distance below the bed surface, the length of the bed above that level being sufficient to provide a substantial downward thrust which combined with the magnetic force maintains the catalyst and associated ferrous material in the second passage in substantially compact static form throughout the length of the passage, said magnetic force, while insufficient by itself to retain the column of catalyst in the passage, being sufficient to stabilize said column of catalyst and cooperate with said expanded bed in the retention of the column in compact static form.

References Cited in the file of this patent

UNITED STATES PATENTS

| | | |
|---|---|---|
| 2,303,717 | Arveson | Dec. 1, 1942 |
| 2,531,365 | Simpson et al. | Nov. 21, 1950 |
| 2,684,929 | Schutte | July 27, 1954 |

FOREIGN PATENTS

| | | |
|---|---|---|
| 607,821 | Great Britain | Sept. 6, 1948 |